United States Patent
Secor (10) Patent No.: US 10,864,562 B1
(45) Date of Patent: Dec. 15, 2020

(54) AIRFLOW CAPTURE HOOD FLOW CORRECTION SYSTEM

(71) Applicant: Evergreen Telemetry LLC, Tempe, AZ (US)

(72) Inventor: Russell Peter Secor, Tempe, AZ (US)

(73) Assignee: Evergreen Telemetry LLC, Phoenix, AZ (US)

( * ) Notice: Subject to any disclaimer, the term of this patent is extended or adjusted under 35 U.S.C. 154(b) by 243 days.

(21) Appl. No.: 15/712,018

(22) Filed: Sep. 21, 2017

(51) Int. Cl.
| | |
|---|---|
| *B08B 15/02* | (2006.01) |
| *G01F 1/34* | (2006.01) |
| *F24F 11/00* | (2018.01) |
| *F24F 11/72* | (2018.01) |
| *F24F 11/30* | (2018.01) |
| *F24F 110/30* | (2018.01) |
| *F24F 110/00* | (2018.01) |
| *F24F 11/74* | (2018.01) |
| *G01P 5/00* | (2006.01) |

(52) U.S. Cl.
CPC .......... *B08B 15/02* (2013.01); *F24F 11/0001* (2013.01); *F24F 11/30* (2018.01); *F24F 11/72* (2018.01); *G01F 1/34* (2013.01); *F24F 2110/00* (2018.01); *F24F 2110/30* (2018.01); *G05B 2219/24084* (2013.01)

(58) Field of Classification Search
CPC ........ G05B 2219/24084; F24F 13/0218; F24F 11/72; F24F 11/0001; F24F 11/74; F24F 2110/30; F24F 2110/00; B08B 15/02; F15D 1/02; G01F 1/34; G01P 5/00
USPC ..... 454/56, 49, 63, 67, 306, 903; 138/37, 39
See application file for complete search history.

(56) References Cited

U.S. PATENT DOCUMENTS

| | | | | | |
|---|---|---|---|---|---|
| 3,524,611 | A | * | 8/1970 | Kurt | B64C 29/0075 244/53 B |
| 3,748,901 | A | * | 7/1973 | DeBaun | G01F 1/40 73/861.66 |
| 4,030,358 | A | * | 6/1977 | Noll | G01P 5/00 73/861.66 |
| 4,231,253 | A | * | 11/1980 | Ohnhaus | G01F 1/40 73/861.62 |
| 4,481,829 | A | * | 11/1984 | Shortridge | G01F 1/46 73/861.66 |

(Continued)

FOREIGN PATENT DOCUMENTS

| | | | | | |
|---|---|---|---|---|---|
| EP | | 0777109 B1 | * | 4/2005 | .............. G01F 1/40 |
| JP | | S6113112 A | * | 1/1986 | .............. F03B 3/103 |
| JP | | 2003270005 A | * | 9/2003 | |

OTHER PUBLICATIONS

Alnor Products, TSI Incorporated. "Air Volume Instruments". http://brj.dk/wp-content/uploads/2013/09/LoFlo_Balometer_6200-datasheet-english.pdf. Jun. 28, 2016 (per WayBack Machine—https://archive.org/). Copyright 2007 by TSI Incorporated.*

(Continued)

*Primary Examiner* — Edelmira Bosques
*Assistant Examiner* — Christopher Matthew Odell
(74) *Attorney, Agent, or Firm* — Adam R. Stephenson, Ltd.

(57) ABSTRACT

Implementations of an airflow capture hood flow control ring may include a flexible ring including a toroidal shape configured to couple around a base of an airflow capture hood. The ring may be configured to permit an airflow sensor coupled to the airflow capture hood coupled to an inlet to measure a flow of air into the inlet with at least 90% accuracy.

16 Claims, 6 Drawing Sheets

(56) References Cited

U.S. PATENT DOCUMENTS

| | | | | |
|---|---|---|---|---|
| 4,548,076 A * | 10/1985 | Haake | ............... | G01F 7/00 |
| | | | | 73/202 |
| 4,570,493 A * | 2/1986 | Leemhuis | ............... | G01F 1/42 |
| | | | | 73/861.62 |
| 4,754,651 A * | 7/1988 | Shortridge | ............... | G01F 1/363 |
| | | | | 73/1.34 |
| 4,807,667 A * | 2/1989 | Ohnhaus | ............... | G01F 1/40 |
| | | | | 138/45 |
| 4,911,021 A * | 3/1990 | Shortridge | ............... | G01F 1/363 |
| | | | | 73/861.66 |
| 8,578,790 B2 | 11/2013 | Secor | | |
| 8,757,008 B1 * | 6/2014 | Nelson | ............... | G01F 1/44 |
| | | | | 73/861 |
| 9,074,917 B2 | 7/2015 | Secor | | |
| 9,453,746 B2 * | 9/2016 | Brugger | ............... | F24F 13/06 |
| 9,605,857 B2 | 3/2017 | Secor | | |
| 2003/0167740 A1 * | 9/2003 | Murphy | ............... | B01D 45/16 |
| | | | | 55/337 |
| 2014/0024503 A1 * | 1/2014 | Chiang | ............... | A63B 69/004 |
| | | | | 482/83 |
| 2014/0109283 A1 * | 4/2014 | Burgess, Jr. | ............... | B60K 8/00 |
| | | | | 2/69 |

OTHER PUBLICATIONS

"Machine Translation of JPS6113112A". 2020.*
"Machine Translation of EP0777109B1". 2020.*
"Machine Translation of JP2003270005A". 2020.*
Photo of a Shortridge Instruments airflow capture hood, retrieved on Sep. 20, 2017 and available at http://www.shortridge.com/.
Photo of a TSI/Alnor capture hood, retrieved on Sep. 20, 2017 and available at http://www.tsi.com/alnor-balometer-capture-hood-ebt731/.

* cited by examiner

AIRFLOW CAPTURE HOOD FLOW CORRECTION SYSTEM

BACKGROUND

1. Technical Field

Aspects of this document relate generally to devices used to measure environmental parameters such as airflow. More specific implementations involve airflow capture hood flow correction systems.

2. Background

Conventionally, heating, ventilation, and air conditioning (HVAC) systems are tested, balanced and adjusted using a number of different instruments, including airflow capture hoods. Airflow capture hoods may measure airflow exiting a vent as well as airflow entering a vent. The airflow capture hood includes a grid at a base of the hood. The grid measures the amount of air that passes through the grid and data from the grid is captured by a sensor that provides the data for a calculation of the airflow through the hood. The airflow capture hood may increase resistance to airflow entering or exiting a vent resulting in a loss of accuracy in the airflow measurements. This effect may be especially pronounced when the vent is an inlet and the airflow being measured is entering the vent. Such airflow may be considered "exhaust" or "return" airflow.

SUMMARY

Implementations of an airflow capture hood flow control ring may include a flexible ring including a toroidal shape configured to couple around a base of an airflow capture hood. The ring may be configured to permit an airflow sensor coupled to the airflow capture hood coupled to an inlet to measure a flow of air into the inlet with at least 90% accuracy.

Implementations of airflow capture hood flow control rings may include one, all, or any of the following:

The ring may be configured to permit an airflow sensor coupled to the airflow capture hood to measure a flow of air into the inlet with at least 95% accuracy.

The diameter of a cross section of the ring may be substantially two inches.

The diameter of a cross section of the ring may be substantially three inches.

The diameter of a cross section of the ring may be more than three inches.

The ring may include a foam covered by vinyl.

The ring may be sewn into a base of an airflow capture hood.

Implementations of an airflow capture hood flow control system may include an airflow capture hood and a ring coupled around a base of the airflow capture hood. A cross section of the ring may have a diameter of substantially three inches.

Implementations of airflow capture hood flow control systems may include one, all, or any of the following:

The ring may extend below the airflow capture hood.

The ring may form one of a toroid and a rectangular shaped ring.

The ring may be configured to permit an airflow sensor coupled to the airflow capture hood coupled to a vent to measure a flow of air into the vent with at least 90% accuracy.

The ring may be configured to permit an airflow sensor coupled to the airflow capture hood coupled to a vent to measure a flow of air into the vent with at least 95% accuracy.

The ring may be held to the airflow capture hood by pressure between the ring and a base of the airflow capture hood.

Implementations of an airflow capture hood flow control system may include an airflow capture hood including a grid coupled to a base of the airflow capture hood and a ring coupled around the base of the airflow capture hood. The ring may include a foam covered by vinyl.

Implementations of airflow capture hood flow control systems may include one, all, or any of the following:

The ring may be configured to permit an airflow sensor coupled to the airflow capture hood coupled to a vent to measure a flow of air into the vent with at least 90% accuracy.

The ring may be configured to permit an airflow sensor coupled to the airflow capture hood coupled to a vent to measure a flow of air into the vent with at least 95% accuracy.

The ring may form one of a toroid and a rectangular ring shape.

The ring may extend below the airflow capture hood.

The foam may be at least three inches thick.

The base of the hood may include a bell mouth shape.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, and its aspects and implementations, are not limited to the specific components, assembly procedures or method elements disclosed herein. Many additional components, assembly procedures and/or method elements known in the art consistent with the intended airflow capture hood flow correction systems will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such airflow capture hood flow correction systems, and implementing components and methods, consistent with the intended operation and methods.

Figure 1:
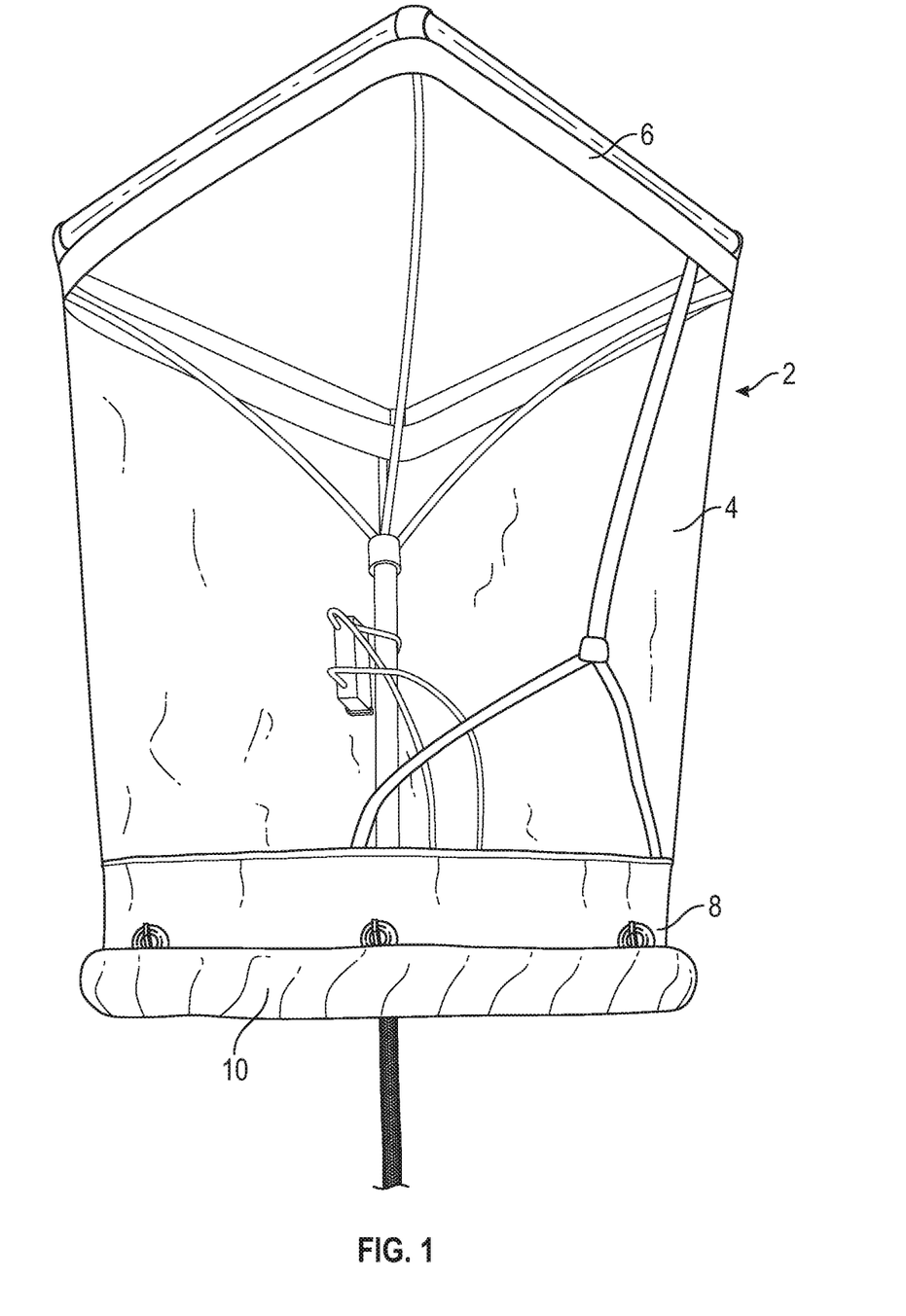
FIG. 1 is a side perspective view of an airflow capture hood flow correction system.

Referring to FIG. 1, a side perspective view of an airflow capture hood flow correction system is illustrated. The airflow capture hood flow correction system 2 includes an airflow capture hood 4 (hereinafter "hood") to test, adjust, and balance airflow exiting or entering a diffuser in a heating, ventilation, and air conditioning (HVAC) system. A top portion 6 of the hood 4 is placed around a vent, inlet, or return. When the hood is used for a return, airflow enters the hood 4 at a base 8 and continues on into the return. Various hoods and other related components disclosed herein may be used in conjunction with the airflow capture hood flow correction systems, including the implementations of hoods and/or related methods disclosed in the following: U.S. patent application Ser. No. 15/711,986, to Russell Peter Secor entitled "Airflow Capture Hood," filed on Sep. 21, 2017; U.S. Pat. No. 9,605,857 to Russell Peter Secor, entitled "Wireless sensors system and method of using same," filed Aug. 11, 2011 and issued Mar. 28, 2017; U.S. Pat. No. 8,578,790 to Russell Peter Secor, entitled "Apparatus for Measurement of Ducted Air," issued Nov. 12, 2013; and U.S. Pat. No. 9,074,917 to Russell Peter Secor, entitled "Apparatus for Measurement of Ducted Air," issued Jul. 7, 2015, the disclosures of each of which are hereby incorporated entirely herein by reference. In various implementations, hoods different from the hood 4 illustrated in FIG. 1 may be used in conjunction with an airflow capture hood flow control system. Such hoods may have a rigid or pliable skirt. The hoods may also include a rigid bottom portion, or base, used to support the remainder of the hood. The hoods may be any size and may have varying shapes. In particular implementations, the base 8 of the hood may have a perimeter the shape of a circle, rectangle, rounded rectangle, or any other closed perimeter geometrical shape. Further, the base may or may not have a bell mouth shape.

Figure 2:
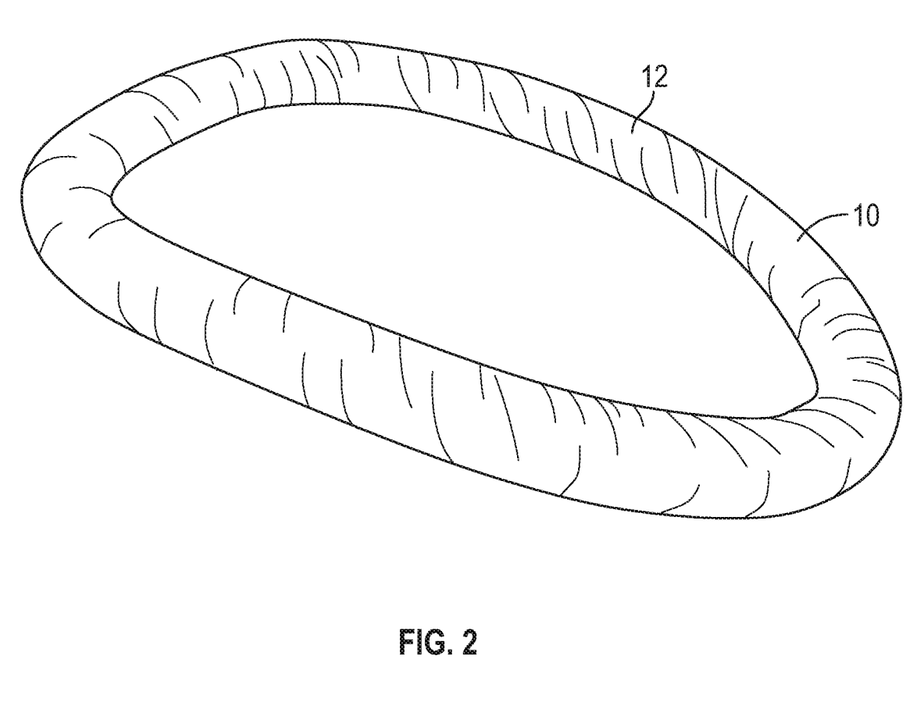
FIG. 2 is a perspective view of a ring of FIG. 1.

The airflow capture hood flow correction system 2 includes an airflow capture hood flow control ring 10 (hereinafter "ring") coupled around a base 8 of the hood 4. Referring to FIG. 2, a perspective view of the ring 10 of FIG. 1 is shown. In various implementations, the ring may be flexible, while in other implementations, the ring may be rigid. When flexible, the ring may be made from, by non-limiting example, foam, rubber, plastic, cloth, or any other flexible material. In a particular implementation, the ring is made from a closed cell polyethylene foam. The foam may be elastic in various implementations. The ring 10 may be covered by a covering 12. In various implementations, the covering is a two-way stretch vinyl. In other implementations, the ring 10 may be inflatable and may only consist of an outer covering that holds air or another gas.

Because the ring is configured to couple around a base of the hood, the shape of the ring 10 corresponds to the shape of the perimeter of a base of the hood that the ring is to be coupled to. In various implementations, the shape of the ring may be, by non-limiting example, toroidal, rectangular, square, rounded rectangular, or any other closed perimeter shape. In implementations where the ring is flexible, it may be coupled to hoods with a base that have a circular opening as well as hoods with a base that have a rectangular or other non-circular shaped opening. The size of the ring also corresponds to the size of the base of the hood that the ring is to be coupled to. In various implementations where the ring is stretchable, the diameter of the ring may be slightly smaller than the diameter of the opening at the base of the hood as the ring can stretch around the base of the hood and couple using the elastic bias force of the ring. In various implementations, the cross section of the ring is substantially circular. The diameter of the cross section of the ring 10 may be about three inches. In other implementations, the diameter of the cross section of the ring 10 may be more or less than three inches. In a particular implementation, the diameter of the cross section of the ring 10 is about two inches.

Figure 3:
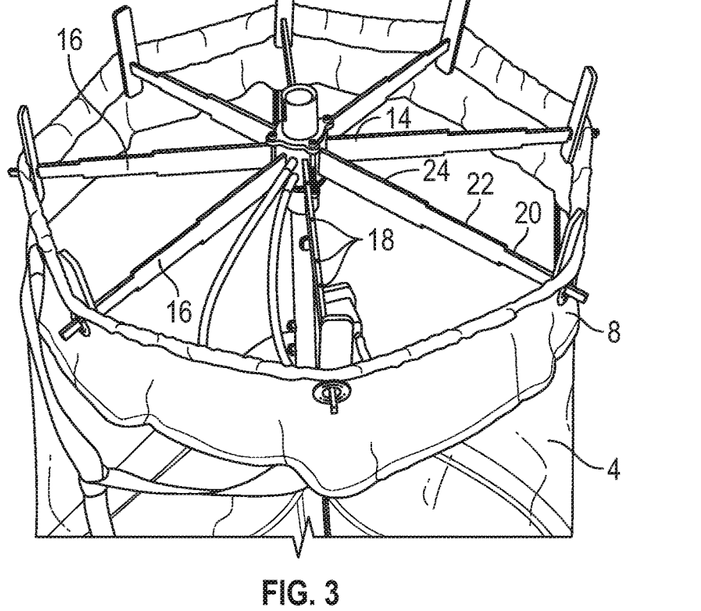
FIG. 3 is a bottom perspective view of the bottom portion of an airflow capture hood of FIG. 1 without a ring.

Referring now to FIG. 3, a bottom perspective view of the bottom portion of an airflow capture hood of FIG. 1 without a ring is illustrated. The base 8 of the hood 4 includes a grid 14. The grid 14 is coupled to a sensor which measures airflow into the hood as air passes through the grid. Specifically, the grid 14 includes a plurality of ribs 16. The plurality of ribs 16 extend across the opening at the base 8 of the hood 4. In various implementations, the plurality of ribs 16 may include any number of ribs and may be in any pattern depending on the particular hood being used. Referring to FIG. 3, the plurality of ribs 16 include a plurality of holes 18 therein. The holes 18 are spaced across the grid so holes are near an outer edge area 20 of the grid, a mid-portion 22 of the grid, and a center area 24 of the grid 14. Airflow entering the hood is measured as air enters the plurality of holes 18. Thus, the accuracy of the airflow measurement depends on whether the right amount of airflow is entering the holes 18 according to the design of the particular hood. If airflow is uneven or lacking across the opening formed by the base 8 of the hood 4, then the airflow measurements will be inaccurate as the resistance to the airflow caused by the hood will be reflected in the measurement.

Figure 4:
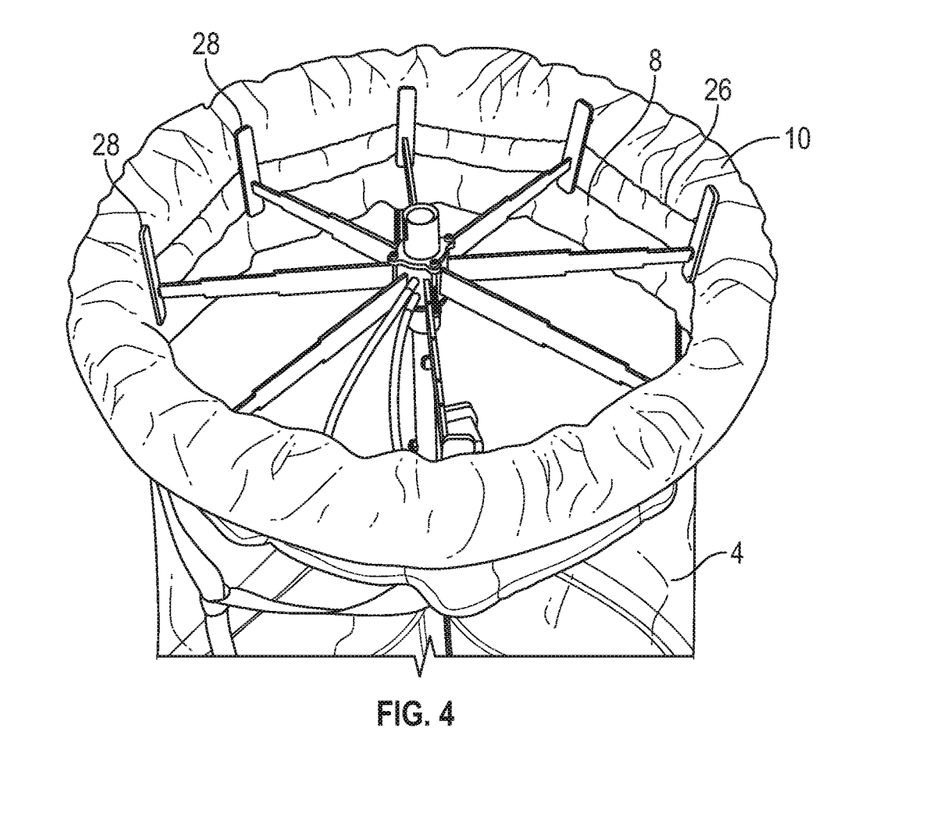
FIG. 4 is a bottom perspective view of the bottom portion of an airflow capture hood of FIG. 1 with a ring coupled thereto.

Referring to FIG. 4, a bottom perspective view of the bottom portion of an airflow capture hood of FIG. 1 with a ring coupled thereto is illustrated. By coupling a ring 10 to the base 8 of the hood 4, the ring permits an airflow sensor coupled to the airflow capture hood to measure a flow of air into a vent with an increase in accuracy as explained later herein. To optimize the increase in accuracy, the ring 10 may be coupled to the base 8 of the hood 4 in a manner where a majority of the ring 10 extends below a bottom edge 26 of the base 8. In various implementations, the hood 4 may include a plurality of ring supports 28. In the implementation illustrated by FIG. 4, the ring supports 28 are skirt retainers. As the ring supports 28 extend below the bottom edge 26 of the base 8, the majority of the ring 10 is able to be below the bottom edge of the base. In other implementations, such as implementations where the base 8 of the hood 4 is rigid, a plurality of ring supports may be attached or clipped to the base 8. The ring may be configured to couple around or to a plurality of ring supports in various implementations. The ring may also couple to the base of the hood using, by non-limiting example, clips, hook and loop fasteners, straps, snaps, or pressure between the ring and the ring supports or the base of the hood, or simply the bias force resulting from the elasticity of a ring that is stretched out.

Figure 5:
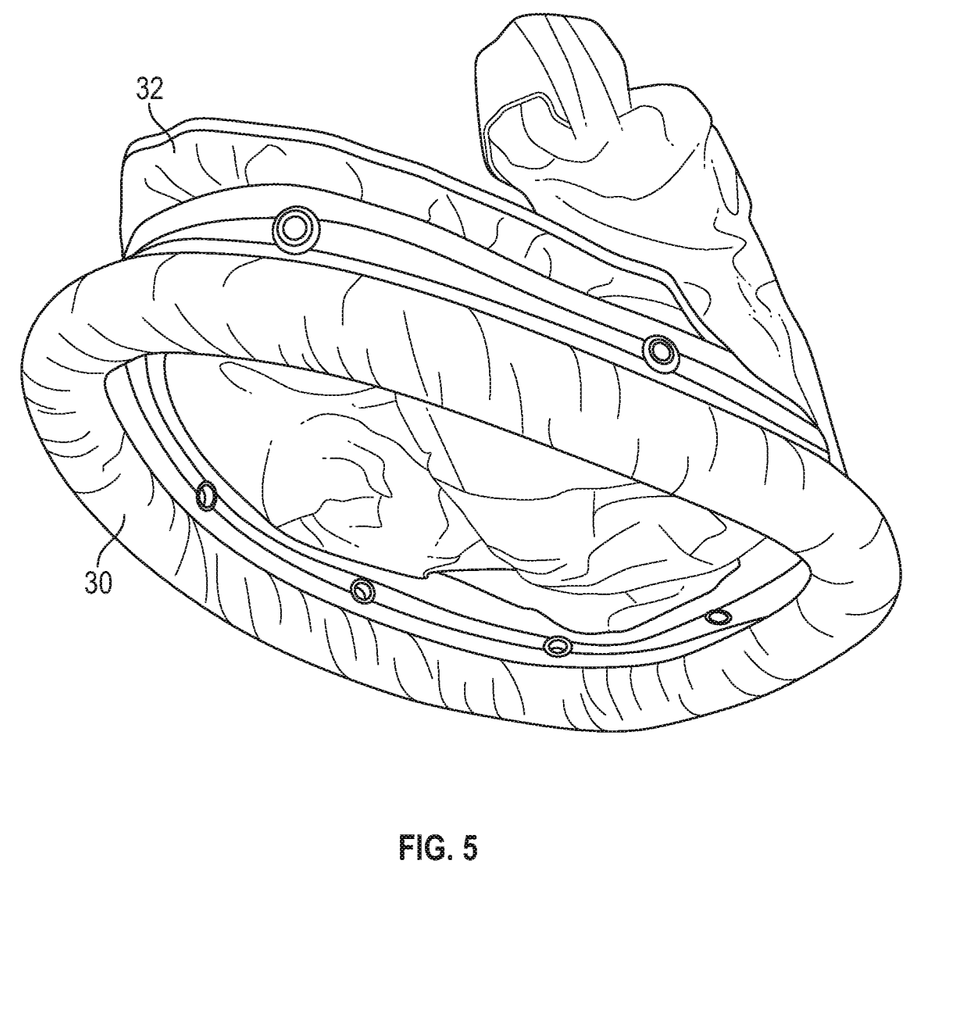
FIG. 5 is a perspective view of a collapsed hood with a ring coupled therein.

Referring to FIG. 5, a perspective view of a collapsed hood with a ring coupled therein is illustrated. In various implementations, as illustrated by FIGS. 1 and 4, the ring may be removably coupled to a base of a hood. In the implementation illustrated by FIG. 5, a ring 30 may be coupled within a hood 32. In a particular implementation, the ring is sewn into the base of hood 32. The ring 30 may be within a portion of the hood 32 that is below the grid. As can be seen in FIG. 5, the ring 30 is below a plurality of grommets which are used to couple a grid to the hood 32.

Figure 6:
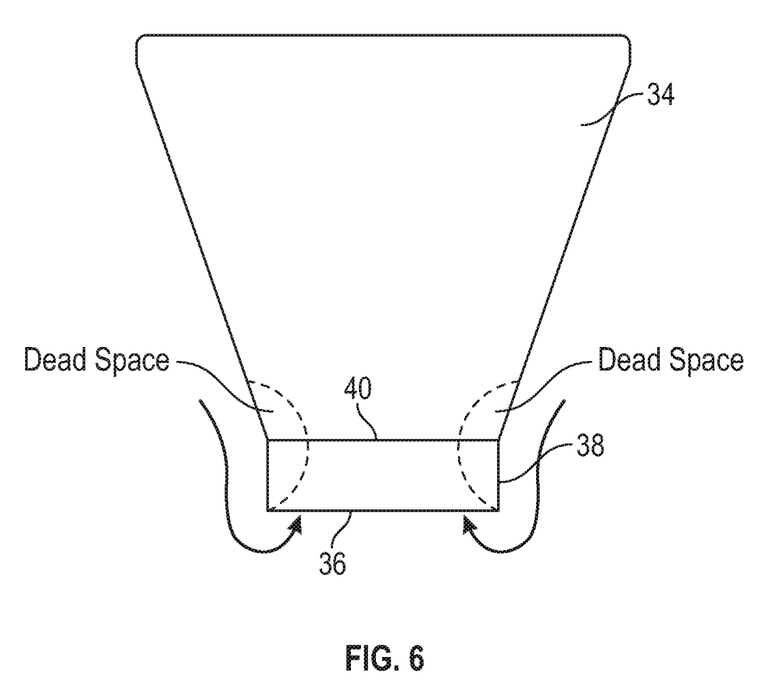
FIG. 6 is a diagram of air entering into an airflow capture hood.

Referring to FIG. 6, a diagram of airflow entering into an airflow capture hood is illustrated. When measuring airflow into a return, air enters the base of hood 34. The air entering the hood 34 is pulled into the hood from different parts of the room, including air that is above a plane formed by the bottom edge 36 of the hood 34. As air enters the hood in the trajectory shown by the arrows in FIG. 6, air comes around the outer wall of the base 38 of the hood 34 and is pushed towards a center 40 of the hood. A dead space substantially void of airflow is observed to be left around the inner edge of the base 38 of the hood 34. The straighter the sidewalls of the base of the hood, the greater the size of the dead space observed will be. Because the grid to the hood is coupled to the base of the hood, the outer edges of the grid wind up becoming located in the dead space around the hood and experience little to no airflow while the center of the grid experiences the proper amount of airflow. Because only portions of the grid experience the proper amount of airflow, the sensors coupled to the grid measuring the flow of air through the hood produce measurements that are inaccurate as the hood impedes the amount of airflow entering the vent. Conventionally, the way to correct for this effect is to apply a correction factor, or coefficient of flow resistance, to the observed measurement in order to more accurately reflect the actual airflow into the vent. The correction factor is empirically calculated for each hood based on its dimensions using known air flow rates.

Figure 8:
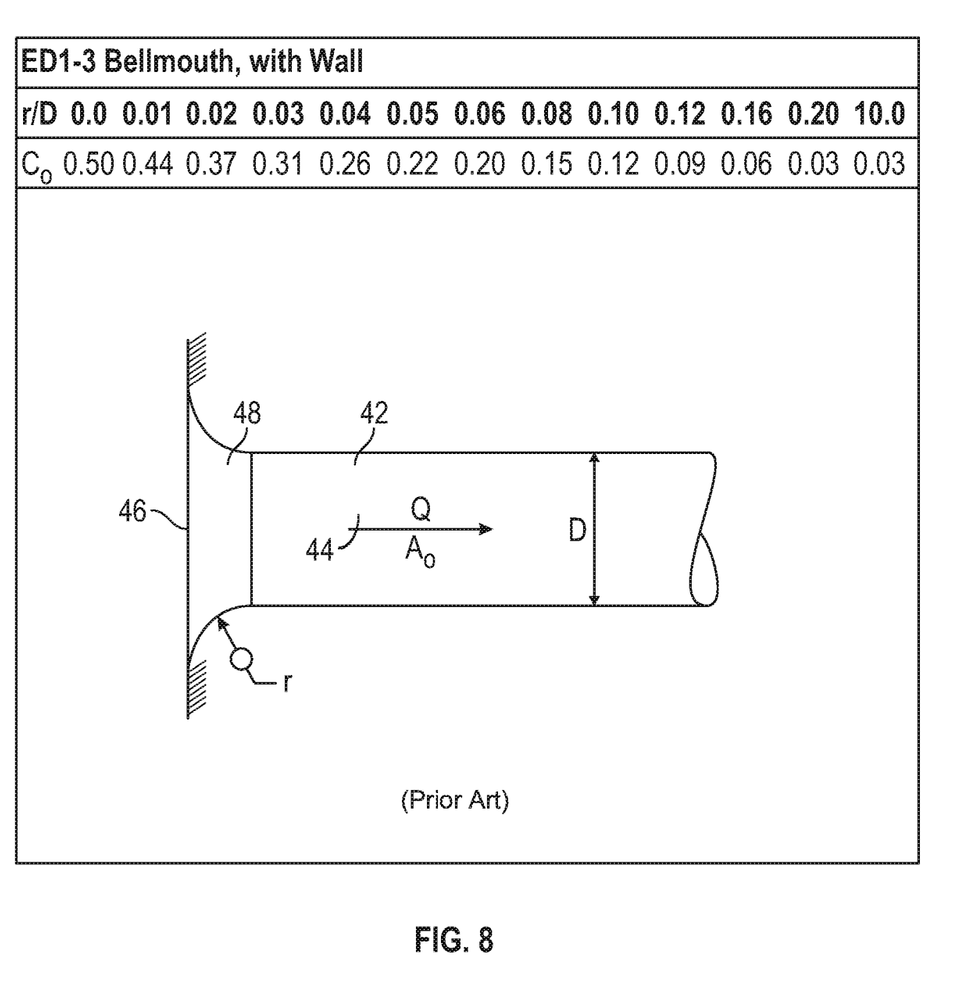
FIG. 8 is a diagram and chart of correction factors for airflow measurements through a duct by radius of curvature of the entry of the duct.

Conventional methods for correcting the uneven airflow across the grid have included incorporating a bell mouth shape in the base of the hood. Such methods have been incorporated into hoods marketed under the tradename SHORTRIDGE INSTRUMENTS® by Shortridge Instruments, Inc. of Scottsdale, Ariz., and hoods marketed under the tradename TSI/ALNOR™ by TSI Incorporated of Shoreview, Minn. Drawbacks to many hoods incorporating a bell mouth shape may include extra weight, a larger hood, and a larger and more bulky carrying case. Referring to FIG. 8, a diagram and chart of illustrating how a bell mouth provides a more even airflow through a duct is shown. The data in this chart comes from the American Society of Heating, Refrigerating and Air-Conditioning Engineers (hereinafter "ASHRAE") handbook. While the diagram and chart of FIG. 8 specifically refer to a duct, the same general principle of correcting airflow taught applies to a hood. As air enters into a duct 42, it is pulled to a center 44 of the duct 42 in a similar fashion as the air is pulled to the center of the hood as described in relation to FIG. 6. A difference between the duct 42 and the hood of FIG. 6 is that air pulled into the duct in a wall surface does not come from below (below referring to on the side of the plane that the duct is on) a plane formed by the bottom edge 46 of the duct. As air travels into the duct, a dead space results around the edges of the base 48 of the duct 42. One of ordinary skill in the art would expect an increased dead space in a hood when compared to a duct as the hood is pulling air from essentially a 360 degree range rather than just a 180 degree range. When the edges of the base are a straight continuation of the walls of the duct 42, the radius of curvature divided by the diameter (r/D) is zero. The radius of curvature is defined as the radius of an approximating circle that touches a curve at a given point and has the same tangent and curvature at that point. In the table, in FIG. 8, there is a coefficient of flow resistance Co that corresponds with the specific r/D. When r/D is zero, or there is no radius of curvature, then the coefficient of flow resistance is 0.50, indicating a high flow resistance. To decrease the flow resistance, the base 48 of the duct may be curved to form a bell mouth shape. As the r/D of the bell mouth, or base of the duct, increases, the correction factor, or necessary coefficient of flow resistance, decreases. This trend is followed until r/D is 0.20. At that point, the coefficient of flow resistance is 0.03, which corresponds to a reduction in flow resistance of airflow entering a hood by 94%. By inspection, increasing the r/D beyond this ratio does not result in further reduction of the coefficient of flow resistance—it remains at 0.03. With this understanding, and according to ASHRAE standards, there would be no reason to include a bell mouth shape in a base with an r/D beyond 0.20.

Figure 7:
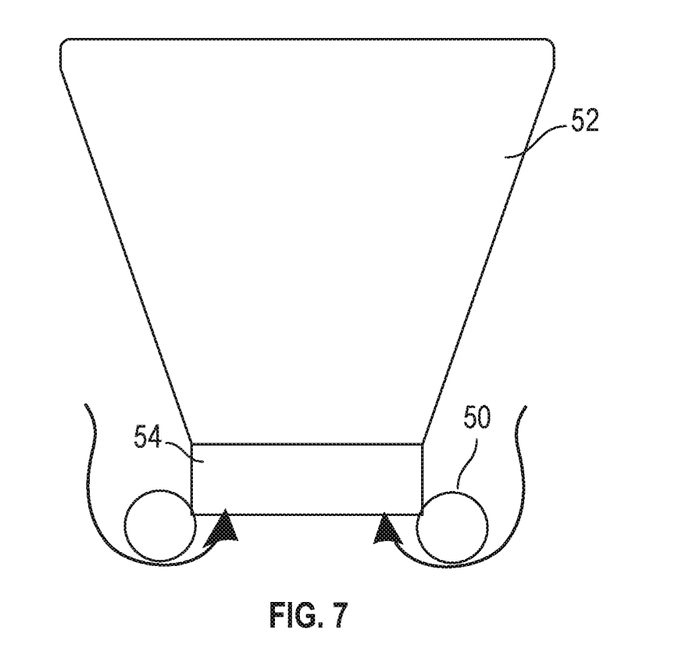
FIG. 7 is a diagram of air entering into an airflow capture hood with a ring coupled thereto.

Referring back to FIG. 7, a diagram of air entering into an airflow capture hood with a ring coupled thereto is shown. The ring may be coupled to a base of the hood with a bell mouth shape or without a bell mouth shape. By including a ring 50 at the base 54 of a hood 52, air enters the hood at a trajectory that eliminates the dead space created by the base of the hood in FIG. 6, and in turn, eliminates or significantly reduces the resistance of airflow entering the vent caused by the hood. Because of this, the resulting error in the measurement of airflow passing into the vent can be significantly reduced and nearly eliminated. In various implementations, by coupling a ring around the base of the hood as described herein, and as illustrated in the diagram of FIG. 7, an airflow sensor coupled to the hood is permitted to measure a flow of air into the vent with at least 90% accuracy. In other implementations, the sensor is permitted to measure a flow of air through the hood with at least 95% accuracy, and in particular implementations, the sensor is permitted to measure a flow of air through the hood with at least 99% accuracy. Generally speaking, as the diameter of a cross section of the ring increases, the accuracy of the measurement of airflow taken by the air sensor also increases.

Below is a table illustrating how a ring coupled to the base of an airflow hood can increase accuracy of a measurement of airflow into a vent. The setpoint column refers to the amount of air that a vent was set to receive in CFM. The no hood column represents the actual amount of air entering the vent. Four different hoods were then tested to see the amount of resistance that the hood added to airflow entering the vent. The hoods tested included a hood with a bellmouth base manufactured under the tradename of SHORTRIDGE INSTRUMENTS® by the company Shortridge Instruments, Inc., of Scottsdale, Ariz., a hood with a straight base manufactured under the tradename of EVERGREEN TELEMETRY THREE POUNDER™ (ET-3#) by the company Evergreen Telemetry LLC, of Phoenix Ariz., the EVERGREEN TELEMETRY THREE POUNDER™ hood with a ring having a cross section with a two inch diameter placed around the base thereof, and the EVERGREEN TELEMETRY THREE POUNDER™ hood with a ring having a cross section with a three inch diameter placed around the base thereof. The table shows the average amount of airflow measured in CFM when each hood was placed against the vent. A percentage of the amount of airflow that entered the vent with each hood is also shown in the table. If a hood did not restrict the airflow entering the vent at all, then the CFM would match the CFM of the no hood and the percentage would be reflected as 100%.

| Setpoint | No Hood | Shortridge Instruments @ Hood with Bellmouth Base | | ET-3# w/out Ring | | ET-3# w/2" Ring | | ET-3# w/3" Ring | |
|---|---|---|---|---|---|---|---|---|---|
| CFM | CFM | CFM | % | CFM | % | CFM | % | CFM | % |
| 1000 | 1006 | 955 | 95 | 932 | 93 | 976 | 97 | 985 | 98 |
| 1500 | 1636 | 1529 | 93 | 1494 | 91 | 1604 | 98 | 1600 | 98 |
| 2000 | 2204 | 2012 | 91 | 1992 | 90 | 2026 | 94 | 2066 | 94 |

As illustrated in the table, the EVERGREEN TELEMETRY THREE POUNDER™ hood without a ring provided the most resistance to airflow entering a vent as it impeded airflow by as much as 10% and as little as 7%. A hood with a bellmouth shaped base, such as the hood manufactured by Shortridge Instruments impeded airflow by as much as 9% and as little as 5%. When a two inch ring was placed on the EVERGREEN TELEMETRY THREE POUNDER™ hood, the resistance of airflow decreased and the hood restricted airflow by as little as 2%. Similarly, when a three inch ring was placed around the base of the EVERGREEN TELEMETRY THREE POUNDER™ hood the hood resisted airflow by as little as 2% under a set airflow of both 1000 CFM and 1500 CFM.

Using the same method as outlined in the above table, in another study, the EVERGREEN TELEMETRY THREE POUNDER™ hood with a ring coupled thereto was used to measure airflow into over 50 different vents. The accuracy of the measurements of airflow entering the vents taken by the airflow capture hood resulted in airflow measurements that were 99% accurate for all the different vents measured.

When using the ring, the near elimination of the need for a correction factor, or coefficient of flow resistance is unexpected for a number of reasons, including that the ring is not a fixed part of the hood base, but a flexible accessory that can be applied as needed. Further, these results were obtained when the ring had a covering of a two way stretch vinyl. Despite the covering being somewhat loose and not uniform, the need for the correction factor was still essentially eliminated.

In places where the description above refers to particular implementations of airflow capture hood flow correction systems and implementing components, sub-components, methods and sub-methods, it should be readily apparent that a number of modifications may be made without departing from the spirit thereof and that these implementations and implementing components, sub-components, methods and sub-methods may be applied to other airflow capture hood flow correction systems.

What is claimed is:

1. An airflow capture hood flow control system comprising:
   an airflow capture hood comprising a collapsible base coupled around a grid, the grid configured to measure a passage of air through the airflow capture hood; and
   a flexible ring comprising a toroidal shape configured to removably couple around an outer surface of the collapsible base of the airflow capture hood;
   wherein the flexible ring is configured to removably couple around the outer surface of the base of the airflow capture hood through compression via an elastic bias force created by stretching then placing the flexible ring around the airflow capture hood.

2. The airflow capture hood flow control system of claim 1, wherein a diameter of a cross section of the flexible ring is substantially two inches.

3. The airflow capture hood flow control system of claim 1, wherein a diameter of a cross section of the flexible ring is substantially three inches.

4. The airflow capture hood flow control system of claim 1, wherein a diameter of a cross section of the flexible ring is more than three inches.

5. The airflow capture hood flow control system of claim 1, wherein the flexible ring comprises a foam covered by vinyl.

6. The airflow capture hood flow control system of claim 1, wherein the collapsible base comprises a portion of a pliable skirt coupled around the grid.

7. An airflow capture hood flow control system comprising:
   an airflow capture hood comprising a pliable skirt coupled around a grid; and
   a ring removably coupled around an outer surface of a base of the pliable skirt;
   wherein a cross section of the ring has a diameter of substantially three inches; and
   wherein an inner circumference of the ring when the ring is not coupled to the airflow capture hood is less than an outer circumference of the outer surface of the base of the pliable skirt.

8. The airflow capture hood flow control system of claim 7, wherein the ring extends below the airflow capture hood.

9. The airflow capture hood flow control system of claim 7, wherein the ring forms one of a toroid and a rectangular shaped ring.

10. The airflow capture hood flow control system of claim 7, wherein the ring is held to the airflow capture hood by pressure between the ring and a base of the airflow capture hood.

11. The airflow capture hood flow control system of claim 7, wherein an outer surface of a base of the airflow capture hood is pliable.

12. An airflow capture hood flow control system comprising:
   an airflow capture hood comprising a grid coupled to a pliable base of the airflow capture hood; and
   a ring coupled around an outer surface of the base of the airflow capture hood;
   wherein the ring comprises a foam covered by vinyl; and
   wherein the grid retains an opening in an open configuration in the base of the airflow capture hood.

13. The airflow capture hood flow control system of claim 12, wherein the ring forms one of a toroid and a rectangle ring shape.

14. The airflow capture hood flow control system of claim 12, wherein the ring extends below the airflow capture hood.

15. The airflow capture hood flow control system of claim 12, wherein the foam is at least 3 inches thick.

16. The airflow capture hood flow control system of claim 12, wherein the outer surface of the base of the airflow capture hood is pliable.

* * * * *